March 25, 1930.  O. MILLER  1,751,834
HOG HOUSE AND PEN
Filed April 30, 1928
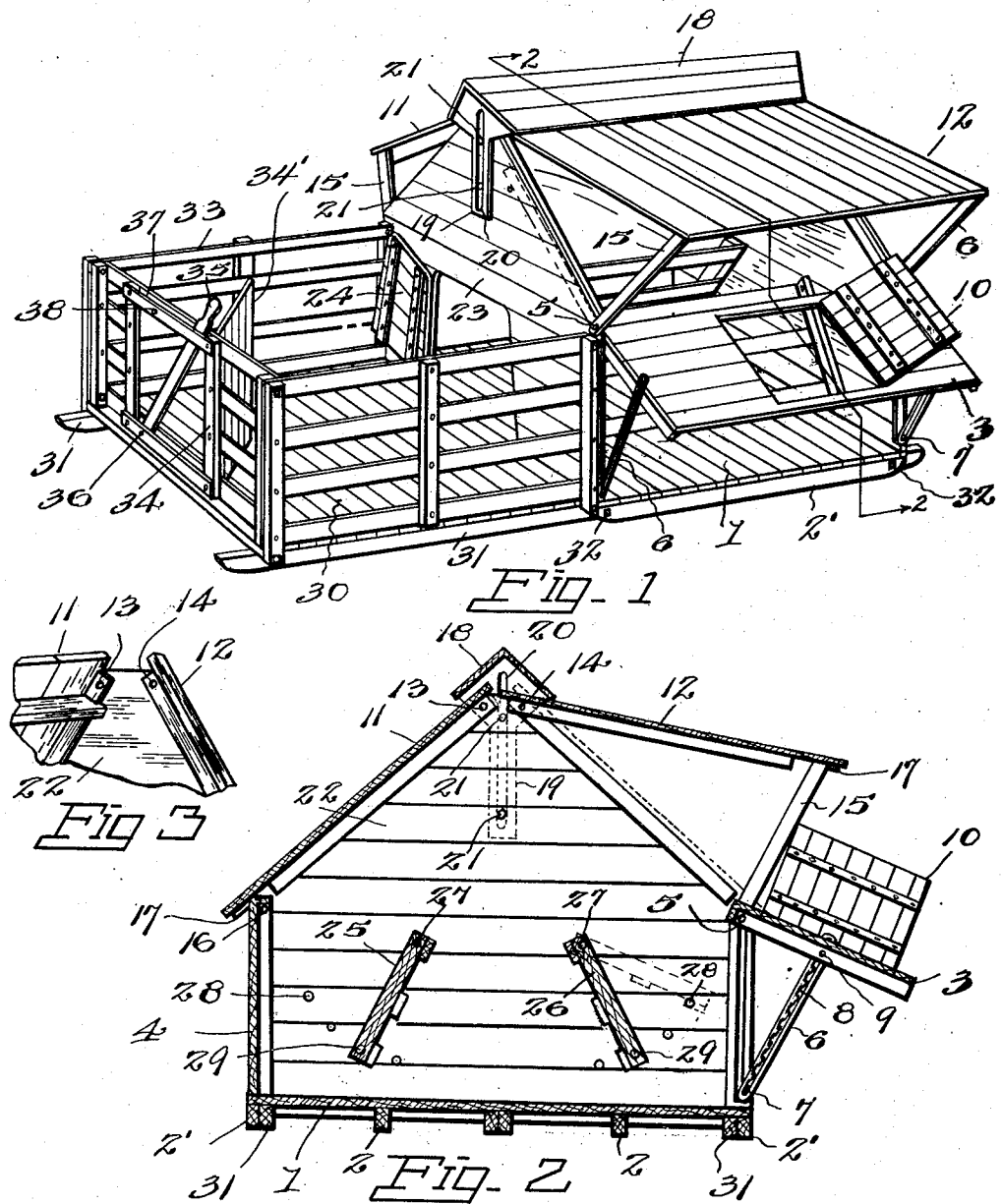
Oscar Miller Inventor
By Herbert E. Smith
Attorney Patented Mar. 25, 1930

1,751,834

UNITED STATES PATENT OFFICE

OSCAR MILLER, OF SPOKANE, WASHINGTON

HOG HOUSE AND PEN

Application filed April 30, 1928. Serial No. 274,005.

The present invention relates to an improved hog house and pen and involves the use of a knock down structure which is manufactured in parts of standard sizes and shapes so that they may readily and compactly be stored for shipment, and may with equal facility be erected to provide the structure for animal husbandry. In carrying out my invention I provide a hog house and farrowing pen therein, together with a yard or unroofed corral, and means are provided for restraining a pig in the corral while a ring is being applied to its nose, or while other treatment is being applied to the animal.

The house and farrowing pen are so constructed as to be well ventilated, readily accessible, and to form a stable, durable enclosure which is portable and may therefore be moved with facility about the yard or farm to desired locations.

The invention consists in certain novel combinations and arrangements of parts as will hereinafter be more fully set forth and claimed. In the accompanying drawings I have illustrated one complete example of the physical embodiment of my invention, which is now in successful use, wherein the parts are combined and arranged according to the best mode I have thus far devised for the practical application of the principles of my invention.

Figure 1 is a perspective view of the house and its yard, showing a side wall and the roof walls in open position for ventilation. Figure 2 is a vertical, transverse sectional view of the house as at line 2—2 of Figure 1. Figure 3 is a detail perspective view showing a portion of the ridge of the house with two pivoted roof sections.

As before stated the structure is of the knock down type and is portable, and the house includes a floor portion 1 that is secured to the sills 2 and 2', the latter being used as skids when the house is being moved from place to place, the sills 2' being used as skids to slide over the ground as the house is moved as by the use of a crow bar or other implement.

The house is provided with side walls 3 and 4, the former being hinged along its upper edge at 5 so that it may be swung upwardly and outwardly, as seen in Figures 1 and 3, for ventilation and for ingress and egress of the animals. The hinged side wall is held in open position by means of a pair of braces as 6, 6 that are hinged at their lower ends at 7 to swing upwardly to inclined or vertical position. The hinged side wall may be held in adjusted, open position by means of racks or notches 8 on these braces with which pins 9 co-act, said pins being fixed to the side wall and adapted to be engaged in complementary notches of the two braces.

When the side wall of the house is closed, access may be had to the interior of the house through a trap-door 10 that is hinged in the side wall and adapted to be opened for the purpose.

The roof structure is also adapted to be opened for ventilation of the interior of the house and said structure comprises two sections 11 and 12 that are pivoted at 13 and 14 respectively along the ridge portion of the house with their free, lower edges projecting over the two side walls and adapted to be swung outwardly and upwardly therefrom, as seen in Figure 1 and at the right in Figure 2.

The sections, when opened or partially opened may be supported in adjusted position by the use of a pair of brace arms 15, one pair for each section. One pair of arms is pivoted on the side-wall pivot or hinge 5 and the other is pivoted to the stationary side wall 4 at 16. When the roof sections are swung upwardly the braces, at their free ends, are adapted to co-act with battens or wood strips 17, that extend along the under sides at the free edges of the roof sections, for holding the roof sections in adjusted position.

Above the two parallel, upper edges or ridge portions of the roof sections is arranged a ridge-hood 18, said hood being approximately right-angular in shape and with its lower edges overlapping or extending over the upper edges of the roof sections at all times to protect the interior of the house. The hood is automatically lifted as either or both of the roof sections are adjusted, and performs its functions with either or both of the roof sections in adjusted position. For this purpose the hood is provided with depending end boards 19 that have vertical slots 20 in them and the hood through the boards is guided and retained in proper position by means of two pairs of guide pins 21 rigid with the opposite ends 22 and 23 of the house. Thus as one roof section is adjusted, or as both of them are adjusted, the section or sections, by contact with the lower edge or edges of the hood, lift the hood, and the latter is guided by the co-action of the slots and pins.

The end wall 23 of the house is provided with a doorway and door 24 to provide ingress and egress for the animals to and from the house.

Within the interior of the house I provide a farrowing pen for the sow and little pigs, said pen comprising a pair of spaced boards or partitions 25 and 26, each of which is hinged at its upper end at 27 to the end walls 22 and 23 of the house, and these boards are designed to swing outwardly and their lower free edges upwardly as indicated by dotted lines in Figure 2. The end walls are provided with pin holes 28 and pins 29 may be inserted in selected holes to support the free ends or edges of the pen boards.

The boards for the farrowing pen may be swung up nearly to horizontal position in order that the lower part of the house may be entirely free and unobstructed, or they may be turned to adjusted position for farrowing purposes to confine the sow and permit the little pigs to reach under their lower edges. When not used for farrowing purposes the farrowing pen may be utilized as racks for hay and other feed that is stored between the outer faces of the boards and the inner sides of the side walls of the house.

A separable, portable, and detachable corral or yard is used in connection with the house and is provided with a floor 30 that forms an exterior extension of the house floor. The floor 30 is supported on sills 31 that may be used as skids, and these sills are secured to the house-sills 2' by means of bolts 32 that are readily removable when required.

A fence 33 is provided for three sides of the yard, the fourth side being closed by the house, and a frame 34 for a gate opening is used for the hinged gate 34'. The frame may be used as a restraining device for pigs when they are being "ringed" or otherwise treated, and for this purpose a restraining lever 35 is pivoted at 36 in the frame and is adapted to swing through the slotted upper bar 37 of the frame. After the lever is swung over against the neck of the animal with his head projecting outwardly through the frame, a retaining pin 38 for the lever is slipped in pin holes of the upper part or bar 37 of the frame, to hold the lever in place, thus permitting the use of both hands of the person "ringing" the nose of the pig.

From the above description, taken in connection with my drawings, it will be apparent that I have provided a structure that may be shipped or stored in knock down condition, may readily be assembled and erected, and which provides a convenient house and pen for its purpose.

Having thus fully described my invention, what I claim as new and desire to secure by Letters Patent is—

1. The combination in a hog-house with a hinged roof section adapted to swing upwardly, and means for holding said section in adjusted position, of a hood adapted to be lifted by the upward swing of the section, slotted end boards for said hood, and guide pins on the house for co-action with said slotted end boards.

2. The combination in a hog-house with a hinged roof-section adapted to swing upwardly and braces hinged on the house for holding said section in open position, of a hood supported in the path of movement of the section and adapted to be lifted thereby, and coacting guides on the hood and house whereby the hood may by gravity be restored to position of repose.

In testimony whereof I affix my signature.

OSCAR MILLER.